(12) United States Patent
Farmer

(10) Patent No.: US 7,462,220 B2
(45) Date of Patent: Dec. 9, 2008

(54) METHODS AND SYSTEMS FOR DETECTING FILTER RUPTURE

(75) Inventor: Terry Lewis Farmer, Kearney, MO (US)

(73) Assignee: General Electric Company, Schenectady, NY (US)

( * ) Notice: Subject to any disclaimer, the term of this patent is extended or adjusted under 35 U.S.C. 154(b) by 490 days.

(21) Appl. No.: 11/216,979

(22) Filed: Aug. 31, 2005

(65) Prior Publication Data

US 2007/0044656 A1    Mar. 1, 2007

(51) Int. Cl.
*B01D 45/08* (2006.01)
(52) U.S. Cl. .......................... 95/1; 96/418; 55/DIG. 34
(58) Field of Classification Search ................ 96/418, 96/417, 419, 420, 421, 422, 424; 55/DIG. 17, 55/DIG. 34; 204/556, 665, 674; 95/1
See application file for complete search history.

(56) References Cited

U.S. PATENT DOCUMENTS

| | | | |
|---|---|---|---|
| 4,272,262 A | 6/1981 | Britt et al. | |
| 4,279,508 A | 7/1981 | Everroad | |
| 5,148,669 A * | 9/1992 | Sellakumar | 60/39.092 |
| 5,294,407 A * | 3/1994 | Succi et al. | 422/119 |
| 5,311,023 A | 5/1994 | Means, Jr. et al. | |
| 5,755,096 A | 5/1998 | Holleyman | |
| 5,772,711 A * | 6/1998 | Kieffer | 96/421 |
| 6,104,032 A | 8/2000 | Means et al. | |
| 6,261,333 B1 | 7/2001 | Dickson | |
| 6,377,171 B1 | 4/2002 | Fewel | |
| 6,565,255 B2 | 5/2003 | Sanderson | |
| 6,716,274 B2 | 4/2004 | Gogins et al. | |
| 6,923,848 B2 * | 8/2005 | Totoki | 96/26 |
| 7,097,694 B1 | 8/2006 | Jaroszczyk et al. | |
| 7,153,346 B2 * | 12/2006 | Ball et al. | 96/413 |
| 7,235,123 B1 * | 6/2007 | Biegelsen | 96/26 |
| 7,261,762 B2 * | 8/2007 | Kang et al. | 95/1 |
| 7,306,653 B2 * | 12/2007 | Bellows et al. | 95/210 |
| 2001/0054354 A1 * | 12/2001 | Baudat et al. | 95/214 |

* cited by examiner

*Primary Examiner*—Duane Smith
*Assistant Examiner*—Minh-Chau T. Pham
(74) *Attorney, Agent, or Firm*—Armstrong Teasdale LLP

(57) ABSTRACT

Methods and systems for detecting filter rupture are provided. The system includes a light emitter positioned on a first lateral side of a fluid flow and configured to emit light at a predetermined intensity into the fluid flow downstream from a fluid filter, a light receiver positioned on a second lateral side of the fluid flow and configured to receive at least a portion of the emitted light, and a controller configured to receive a signal from said light receiver corresponding to the intensity of the emitted light or the pulsations in the light received, also known as scintillation, said controller configured to generate a corresponding output signal.

20 Claims, 3 Drawing Sheets

1

METHODS AND SYSTEMS FOR DETECTING FILTER RUPTURE

BACKGROUND OF THE INVENTION

This invention relates generally to gas turbine engines and more particularly, to methods and systems for detecting filter rupture in gas turbine engine inlet streams.

Gas turbine engines are used as a power source within a variety of applications. To protect the engine from the environment, and to shield the surrounding environment from the gas turbine engine, at least some known gas turbine engines are housed within an engine assembly compartment that includes an inlet area, an exhaust area, such as an extraction duct, and an engine area that extends between the inlet area and the exhaust area. For example in a power generation facility where the gas turbine engine is used as a power source for an electrical generator, the engine may be housed inside a compartment which facilitates reducing noise and heat generated during engine operation.

Within at least some known compartments, the inlet includes ducts that route ambient air from outside the compartment into the engine compartment for cooling the engine and compartment, and to the engine for supplying combustion air. Particulate or moisture carryover from the atmosphere to the gas turbine engine inlet can lead to failure of the compressor section of the gas turbine engine. To facilitate alleviating the effects of moisture carryover, at least some known gas turbine engines include a filter in the inlet duct that substantially prevents particulate and moisture carryover from reaching the gas turbine engine inlet. However, a failure or rupture of the filter may allow particulate and moisture carryover. Accordingly, at least some known gas turbine engines use a differential air pressure monitor that senses differential pressure across the filter as an indication of a ruptured filter. However, in some cases of filter rupture, the differential pressure may decrease, in other cases the differential pressure increases such that differential pressure is an unreliable parameter to monitor for filter failure detection.

BRIEF DESCRIPTION OF THE INVENTION

In one embodiment, a system for detecting filter rupture is provided. The system includes a light emitter positioned on a first lateral side of a fluid flow and configured to emit light at a predetermined intensity into the fluid flow downstream from a fluid filter, a light receiver positioned on a second lateral side of the fluid flow and configured to receive at least a portion of the emitted light, and a controller configured to receive a signal from said light receiver corresponding to the intensity of the emitted light, said controller configured to generate an output signal corresponding to a variation of the intensity of the emitted light.

In another embodiment, a method of determining a rupture of a filter in a fluid flow includes receiving at least a portion of a beam of light that is at least partially attenuated by particles in a fluid flow, determining a variation of the intensity of the beam of light due to the particles intermittently attenuating the beam of light, and comparing the variation with a selectable threshold to generate a signal indicative of a filter failure.

In yet another embodiment, a gas turbine engine system includes a gas turbine engine including a combustion air inlet duct, a filter positioned in the inlet duct such that at least a portion of the inlet air is channeled through the filter, and an optical scintillation probe positioned in a wall of the inlet duct configured to determine a distribution of particles in the inlet duct using a variation of the intensity of light received from a light source positioned on a wall of the inlet duct.

DETAILED DESCRIPTION OF THE INVENTION

Figure 1:
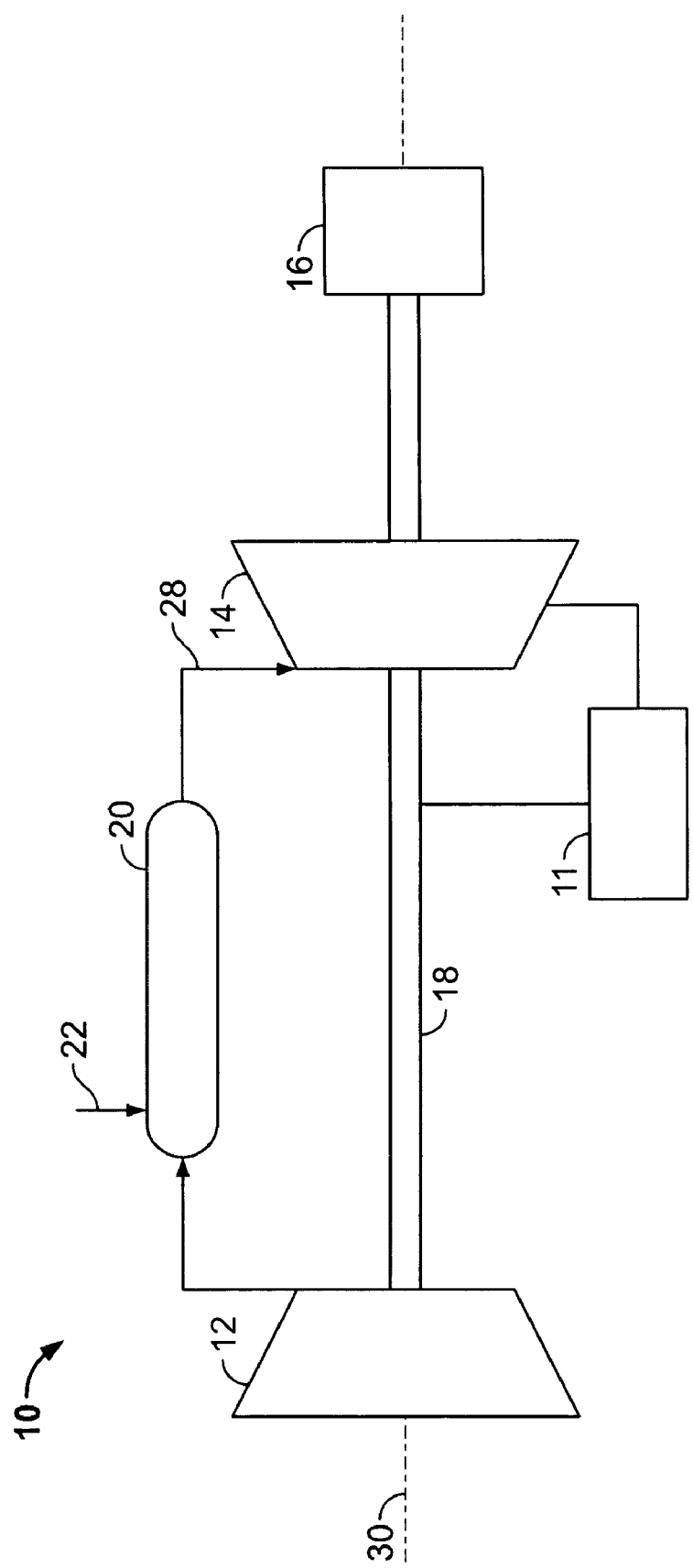
FIG. 1 is a schematic illustration of an exemplary gas turbine engine.

FIG. 1 is a schematic illustration of an exemplary gas turbine engine 10, controlled by a controller 11, and coupled to an electric generator 16. Controller 11 is a processor-based system that includes engine control software that configures controller 11 to perform the below-described processes. As used herein, the term processor is not limited to only integrated circuits referred to in the art as processors, but rather broadly refers to computers, processors, microprocessors, microcontrollers, microcomputers, programmable logic controllers, application specific integrated circuits (ASIC), logic circuits, and any other programmable circuits or processors capable of executing the system as described herein. In the exemplary embodiment, gas turbine system 10 includes a compressor 12, a turbine 14, and a generator 16 arranged in a single monolithic rotor or shaft 18. In an alternative embodiment, shaft 18 is segmented into a plurality of shaft segments, each shaft segment being coupled to an adjacent shaft segment to form shaft 18. Compressor 12 supplies compressed air to a combustor 20 where it mixes with fuel supplied via a stream 22. In one embodiment, engine 10 is a 7FB gas turbine engine commercially available from General Electric Company, Greenville, S.C.

In operation, air flows through compressor 12 and compressed air is supplied to combustor 20. Combustion gases 28 from combustor 20 propels turbines 14. Turbine 14 rotates shaft 18, compressor 12, and electric generator 16 about a longitudinal axis 30.

Figure 2:
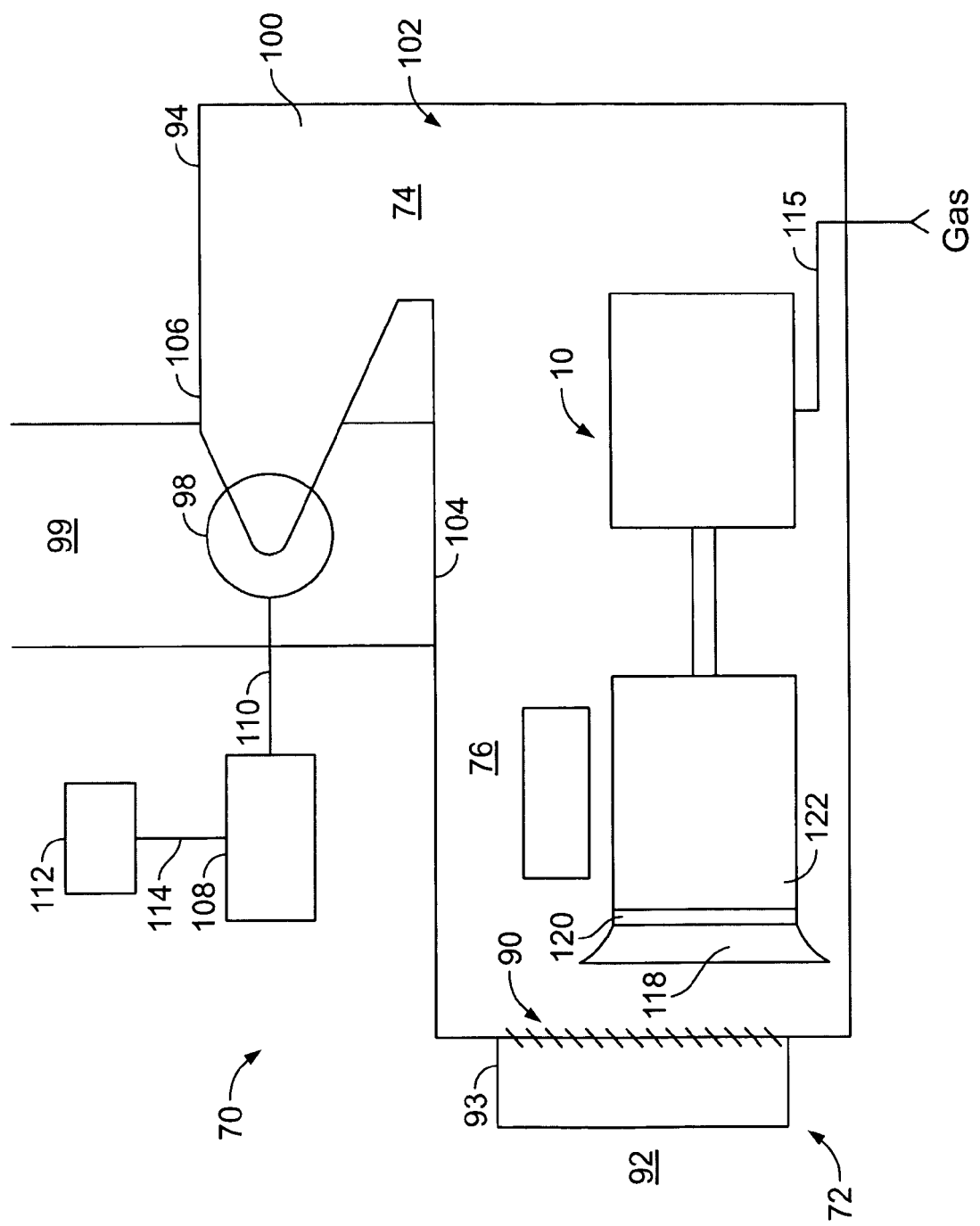
FIG. 2 is a cross-sectional side view of an exemplary gas turbine generator compartment that may be used with the gas turbine engine shown in FIG. 1.

FIG. 2 is a cross-sectional side view of an exemplary gas turbine generator compartment 70 that may be used with gas turbine engine 10 (shown in FIG. 1). Turbine compartment 70 includes an inlet area 72, an exhaust area 74, and an engine area 76 that extends between inlet and exhaust areas 72 and 74, respectively. More specifically, compartment engine area 76 is sized to receive engine 10 therein. Compartment inlet area 72 includes an inlet duct damper 90 that is coupled in flow communication between compartment engine area 76 and an ambient air space 92 to receive ambient airflow therethrough. In the exemplary embodiment, a filter 93 is positioned in the inlet duct to facilitate reducing particulate and moisture carryover from ambient air space 92.

Compartment exhaust area 74 includes an extraction duct 94 that is coupled in flow communication with a fan housing 98. More specifically, a first end 100 of extraction duct 94 is coupled to an exit opening 102 defined in a ceiling 104 enclosing compartment 70. A second end 106 of duct 94 is coupled to housing 98. The air flow is discharged from the compartment cooling system at a fan discharge 99.

Fan housing 98 includes a fan rotor (not shown) that is rotationally coupled to a motor 108 through a shaft 110. Motor 108 is electrically coupled to a motor drive 112 through cable 114. Motor drive 112 controls incoming power to motor 108.

In operation, gas turbine engine receives combustion air from ambient area 92 through filter 93, damper 90, and a portion of engine area 76. In the exemplary embodiment, gas turbine engine 10 includes an inlet duct 118 and an inlet filter 120 coupled to an inlet 122 of gas turbine engine 10. Inlet 118 channels air from engine area 76 to engine inlet 122 through filter 120. Filter 120 facilitates reducing the particulate and moisture entering inlet 122.

Figure 3:
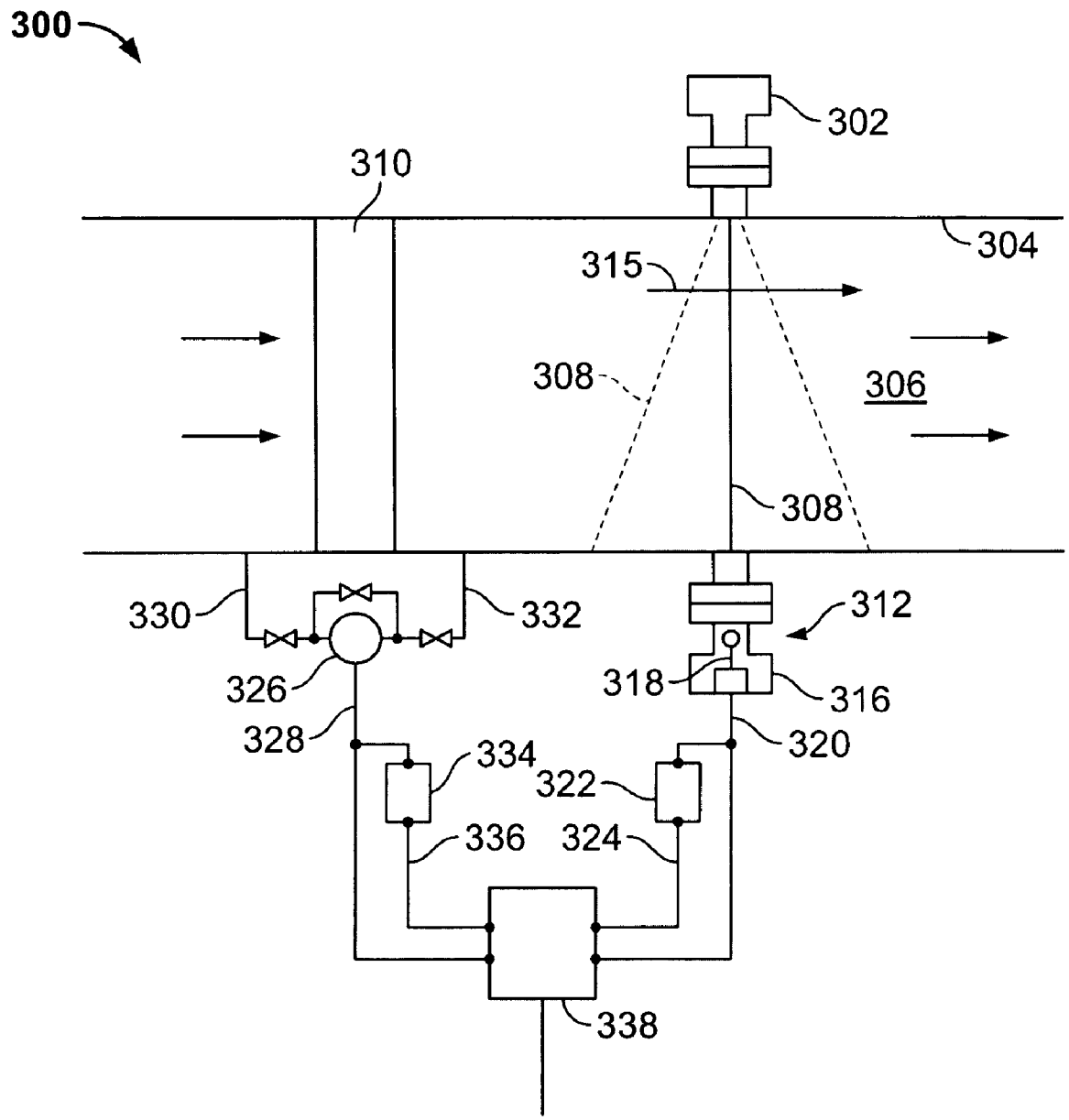
FIG. 3 is an axial perspective view of an exemplary rotor tooth that may be used with the rotor shown in FIG. 2.

FIG. 3 is a schematic block diagram of an exemplary filter rupture detection system 300 that may be used with gas turbine engine 10 (shown in FIG. 1). Filter rupture detection system 300 includes a light emitter 302 positioned on a first side 304 of a fluid flow 306 and configured to emit light, such as a beam of light 308 at a predetermined intensity into fluid flow 306 downstream from a fluid filter 310. A light receiver 312 is positioned on a second side 314 of fluid flow 306 and configured to receive at least a portion of emitted beam of light 308. Emitter 302 and receiver 312 are positioned such that beam of light 308 traverse fluid flow at an oblique angle with respect to an axis 315 of flow of the fluid. Receiver 312 only needs to receive a portion of the light from beam 308. Accordingly, emitter 302 and receiver 312 may be oriented at various angles with respect to each other and with respect to fluid flow 306. A controller 316 is configured to receive a signal 318 from light receiver 312 that corresponds to the intensity of emitted beam of light 308. Controller 316 is configured to generate an output signal 320 corresponding to a variation of the intensity of the emitted light. In the exemplary embodiment, beam is a highly collimated, narrowly focused beam. In various embodiments of the present invention, beam 308 may be a laser beam or a diffuse and divergent beam. Filter rupture detection system 300 further includes a first comparator 322 configured to generate an output signal 324 indicative of the variation of the intensity of the emitted light 308 exceeding a selectable operating band, such as a high limit and a low limit. The variation of the intensity is related to the number of particles passing between emitter 302 and receiver 312. The more particles passing between emitter 302 and receiver 312 yields a greater amount of "flicker" in the intensity of the emitted beam of light 308.

In the exemplary embodiment, light emitter 302 emits light in the infrared band of the electromagnetic spectrum. In an alternative embodiment, light emitter 302 emits light in other than the infrared band of the electromagnetic spectrum. In the exemplary embodiment, light emitter 302 emits a modulated beam of light 308 such that effects of at least one of stray light, ambient light, and interference from gases in the inlet duct are facilitated being eliminated.

Filter rupture detection system 300 further includes a sensor 326 configured to generate an output signal 328 corresponding to a differential pressure across fluid filter 310. In the exemplary embodiment, sensor 326 is coupled to fluid flow 306 upstream of filter 310 through a high-pressure tap 330 and to fluid flow 306 downstream from filter 310 through a low-pressure tap 332. A second comparator 334 is configured to generate an output signal 336 indicative of the differential pressure across fluid filter 310 exceeding a selectable operating band, such as a high differential pressure and a low differential pressure.

A circuit 338 is configured to combine output signals 320, 324, 328, and 336 in a selectable algorithm to generate an output signal 340 indicative of a rupture of filter 310. For example, circuit 338 may use any one of output signals 320, 324, 328, and 336 to generate output signal 340, or may use any combination of output signals 320, 324, 328, and 336 to generate output signal 340. Moreover, circuit 338 selectably uses other logic and/or process control functions to determine when filter 310 has ruptured based on output signals 320, 324, 328, and 336.

It will be appreciated that a technical effect of the embodiments of the present invention described herein is the reliable and repeatable detection of an increase in the concentration of particulate flowing through a duct due to a rupture of a protective filter media.

The above-described embodiments of filter rupture detection system provide a cost-effective and reliable means for determining when a filter fails such that the operation of equipment downstream from the filter may be adjusted to accommodate the increased flow of particulate. As a result, the methods and system described herein facilitate operating equipment in a cost-effective and reliable manner.

Exemplary embodiments of filter rupture detection systems are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A filter rupture detection system comprising:
   a light emitter positioned on a first lateral side of a fluid flow and configured to emit light at a predetermined intensity into the fluid flow downstream from a fluid filter;
   a light receiver positioned on a second lateral side of the fluid flow and configured to receive at least a portion of the emitted light; and
   a controller configured to receive a signal from said light receiver corresponding to the intensity of the emitted light, said controller configured to generate an output signal corresponding to a variation of the intensity of the emitted light, wherein the output signal is indicative of a rupture of said fluid filter.

2. A system in accordance with claim 1 further comprising a first comparator configured to generate an output signal indicative of the variation of the intensity of the emitted light exceeding a selectable operating band.

3. A system in accordance with claim 1 wherein said light emitter emits light in the infrared band of the electromagnetic spectrum.

4. A system in accordance with claim 1 wherein said light emitter emits a modulated beam of light such that effects of at least one of stray light, ambient light, and interference from gases in the inlet duct are facilitated being eliminated.

5. A system in accordance with claim 1 further comprising a sensor configured to generate an output signal corresponding to a differential pressure across the fluid filter.

6. A system in accordance with claim 5 further comprising a circuit configured to combine the output signal indicative of the variation of the intensity of the emitted light and the differential pressure output signal to generate the signal indicative of a filter rupture.

7. A system in accordance with claim 5 further comprising a circuit configured to combine an output signal indicative of the variation of the intensity of the emitted light exceeding a selectable operating band with the output signal corresponding to a differential pressure across the fluid filter.

8. A system in accordance with claim 5 further comprising a second comparator configured to generate an output signal indicative of the differential pressure across the fluid filter exceeding a selectable operating band.

9. A system in accordance with claim 8 further comprising a circuit configured to combine the output signal indicative of the variation of the intensity of the emitted light and the output signal indicative of the differential pressure across the fluid filter exceeding a selectable operating band to generate the signal indicative of a filter rupture.

10. A system in accordance with claim 8 further comprising a circuit configured to combine an output signal indicative of the variation of the intensity of the emitted light exceeding a selectable operating band and the output signal indicative of the differential pressure across the fluid filter exceeding a selectable operating band to generate the signal indicative of a filter rupture.

11. A method of determining a rupture of a filter in a fluid flow, the method comprising:
    receiving at least a portion of a beam of light that is at least partially attenuated by particles in a fluid flow;
    determining a variation of the intensity of the beam of light due to the particles intermittently attenuating the beam of light; and
    comparing the variation with a selectable threshold to generate a signal indicative of a filter failure.

12. A method in accordance with claim 11 further comprising receiving at least a portion of a beam of infrared light.

13. A method in accordance with claim 11 further comprising receiving a signal corresponding to a differential pressure across the filter.

14. A method in accordance with claim 11 further comprising combining the variation of the intensity of the beam of light with a signal corresponding to a differential pressure across the filter to generate a signal indicative of a rupture of the filter.

15. A gas turbine engine system comprising:
    a gas turbine engine comprising a combustion air inlet duct;
    a filter positioned in said inlet duct such that at least a portion of the inlet air is channeled through the filter; and
    an optical scintillation probe positioned in a wall of the inlet duct configured to determine a distribution of particles in said inlet duct using a variation of the intensity of light received from a light source positioned on a wall of the inlet duct, wherein the determination is indicative of a rupture of said filter.

16. A gas turbine engine system in accordance with claim 15 wherein a contamination buildup on at least one of said probe and said light source reduces the intensity of light received wherein a variation of the intensity of the light at a first buildup of contamination is substantially equal to a variation of the intensity of the light at a second buildup of contamination, the first buildup being different than the second buildup.

17. A gas turbine engine system in accordance with claim 15 wherein the variation of the intensity of light received from a light source is proportional to a concentration of particulate in said inlet duct.

18. A gas turbine engine system in accordance with claim 15 further comprising a differential pressure sensor configured to receive a first pressure in said inlet duct upstream from said filter and to receive a second pressure in said inlet duct downstream from said filter to generate a differential pressure signal.

19. A gas turbine engine system in accordance with claim 18 further comprising a circuit configured to determine a filter rupture using the variation of the intensity of light and the differential pressure signal.

20. A gas turbine engine system in accordance with claim 15 further comprising a circuit configured to determine a filter rupture using the variation of the intensity of light.

* * * * *